United States Patent
Watanabe et al.

(10) Patent No.: US 6,929,857 B2
(45) Date of Patent: Aug. 16, 2005

(54) FIBER FOR REINFORCING RUBBER PRODUCTS

(75) Inventors: Shuji Watanabe, Saitama (JP); Kaoru Shimamura, Saitama (JP); Koji Hattori, Tokyo (JP); Masayoshi Abe, Tokyo (JP); Kimihiro Ando, Tokyo (JP)

(73) Assignees: Honda Giken Kogyo Kabushiki Kaisha, Tokyo (JP); Asahi Fiber Glass Company, Limited, Tokyo (JP)

( * ) Notice: Subject to any disclaimer, the term of this patent is extended or adjusted under 35 U.S.C. 154(b) by 304 days.

(21) Appl. No.: 10/094,011

(22) Filed: Mar. 11, 2002

(65) Prior Publication Data

US 2002/0176986 A1 Nov. 28, 2002

(30) Foreign Application Priority Data

Mar. 12, 2001 (JP) .................................... 2001-069034
Feb. 1, 2002 (JP) .................................... 2002-025589

(51) Int. Cl.[7] .............................................. D02G 3/00
(52) U.S. Cl. ................. 428/392; 428/297.7; 428/300.1; 152/451
(58) Field of Search ................................ 428/375, 392

(56) References Cited

U.S. PATENT DOCUMENTS

| 5,783,625 A | * | 7/1998 | Mori et al. ................. 524/509 |
| 5,804,313 A | * | 9/1998 | Schell ......................... 428/391 |
| 5,824,413 A | * | 10/1998 | Schell ......................... 428/378 |
| 5,861,212 A | * | 1/1999 | Mori et al. .................. 428/375 |
| 2002/0176986 A1 | * | 11/2002 | Watanabe et al. ........... 428/375 |

FOREIGN PATENT DOCUMENTS

| EP | 0 285 094 | 10/1988 |
| EP | 0 353 473 | 2/1990 |
| JP | 50-3184 | 1/1975 |
| JP | 55-114551 | 9/1980 |
| JP | 63-126975 | 5/1988 |
| JP | 63-234075 | 9/1988 |
| JP | 1-221433 | 9/1989 |
| JP | 3-269177 | 11/1991 |
| JP | 4-103634 | 4/1992 |
| JP | 7-190149 | 7/1995 |
| JP | 11-241275 | 9/1999 |

* cited by examiner

Primary Examiner—Cynthia H. Kelly
Assistant Examiner—J. Gray
(74) Attorney, Agent, or Firm—Oblon, Spivak, McClelland, Maier & Neustadt, P.C.

(57) ABSTRACT

Fiber for reinforcing rubber products, which comprises glass fiber coated with a coating film formed by a treating agent comprising a water-soluble condensate of resorcinol and formaldehyde, a latex of a solid acrylonitrile/butadiene copolymer and a latex of a liquid acrylonitrile/butadiene copolymer.

20 Claims, 1 Drawing Sheet

FIBER FOR REINFORCING RUBBER PRODUCTS

Figure 1:
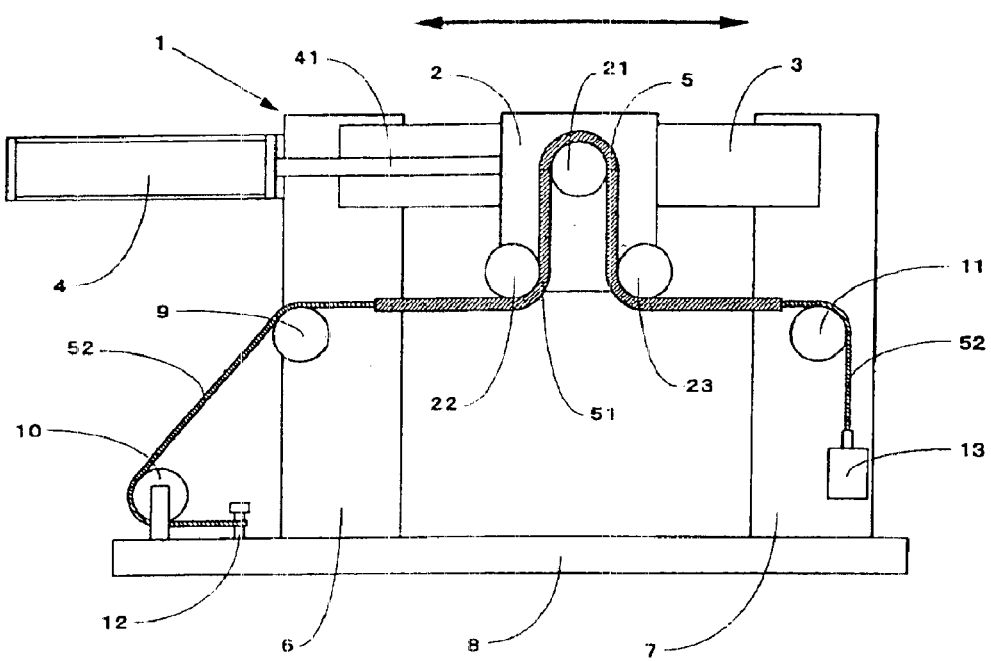

The present invention relates to fiber for reinforcing rubber products, which is used as a reinforcing material for rubber products such as tires or rubber belts including timing belts.

It is common that reinforcing fiber to be used for rubber products such as tires or rubber belts including timing belts, is coated with a coating film formed by a rubber type treating agent in order to increase the adhesion between fiber and a rubber composition as base materials for rubber products, or in order to increase the durability of rubber products. As such a rubber type treating agent, a treating agent comprising a water-soluble condensate of resorcinol and formaldehyde, and a rubber latex, as the main components (so-called RFL treating agent, hereinafter sometimes referred to in this abbreviated form), or a treating agent having a rubber composition dissolved in an organic solvent (so-called rubber cement, hereinafter sometimes referred to in this abbreviated form) is known.

With respect to the above-mentioned RFL treating agent, JP-A-50-3184 proposes an impregnating agent for glass fiber, which comprises from 2 to 10 parts by weight of a resorcinol/aldehyde resin, from 20 to 60 parts by weight of a butadiene/styrene/vinylpyridine terpolymer, from 15 to 40 parts by weight of a carboxylated butadiene/styrene resin and from 3 to 30 parts by weight of an incompatible wax such as paraffin wax.

Further, JP-A-55-114551 proposes a thermosetting adhesive composition for glass fiber, which comprises a butadiene/styrene/vinylpyridine terpolymer, a rubbery polymer composed mainly of butadiene, and a resorcinol/formaldehyde resin.

Further, JP-A-1-221433 proposes a liquid composition for impregnating glass fiber, which comprises a resorcinol/formaldehyde resin, a butadiene/styrene/vinylpyridine terpolymer and a chlorosulfonated polyethylene, in certain specific proportions.

Still further, JP-A-4-103634 proposes a treating agent which comprises a water-soluble condensate of resorcinol and formaldehyde, a vinylpyridine/styrene/butadiene terpolymer latex, and an acrylonitrile/butadiene copolymer latex.

On the other hand, with respect to the above-mentioned rubber cement, e.g. JP-A-63-234075 proposes an adhesive which comprises 100 parts by weight of a composition comprising 100 parts by weight of a solid acrylonitrile/butadiene copolymer, from 5 to 70 parts by weight of a liquid acrylonitrile/butadiene copolymer and/or a functional group-containing liquid acrylonitrile/butadiene copolymer, from 5 to 70 parts by weight of a phenol resin and/or an epoxy resin and from 0.1 to 10 parts by weight of a resin-curing agent, and from 30 to 1,000 parts by weight of a solvent.

However, reinforcing fiber coated with a coating film formed by such a conventional rubber type treating agent, has the following problems, particularly when used as a reinforcing material (core wire) for a timing belt.

In order to meet the demand for downsizing of automobile engines, there has been a tendency in recent years that a timing belt made of rubber as a power transmission means which is used for a power transmission mechanism (hereinafter referred to simply as a power transmission mechanism) to transmit the power of a crank shaft to e.g. a camshaft or a pump, is replaced by a silent chain made of metal. Namely, in a conventional automobile engine, a power transmission mechanism is installed outside of the engine block, and when power transmission means to be used therefor, are compared among those having equal strength and durability, a silent chain may have a small width as compared with a timing belt. Under the circumstance, if the power transmission means is changed from a timing belt to a silent chain, it is possible to shorten the engine size in the axial direction of the crank shaft by from 10 to 20 mm, which is the main reason for the above-mentioned tendency for replacement.

On the other hand, if the power transmission mechanism is installed inside of the engine block, even in the case of employing a timing belt as the power transmission means, it is possible to shorten the engine size in the axial direction of the crank shaft by from 10 to 20 mm in the same manner as described above, whereby merits of employing a timing belt, such as light weight, quietness and easiness in maintenance, can be utilized.

However, in the power transmission mechanism installed inside of the engine block, the power transmission means is required to be used in an environment in contact with the engine oil, whereby the power transmission means is required to have high oil resistance.

In such a case, timing belts employing, as reinforcing materials (core wires), reinforcing fibers coated with coating films formed by the above-mentioned conventional RFL treating agents, were poor in oil resistance, since in each case, a latex of a copolymer using styrene as one of the comonomers, whereby the oil resistance of the rubber itself is relatively low, was used, and it was impossible to practically use them as timing belts which are used for a long period of time in an environment in contact with the engine oil.

Further, it is conceivable to use a treating agent having an acrylonitrile/butadiene copolymer (so-called NBR), whereby the oil resistance of the rubber itself is relatively high, incorporated, like a RFL treating agent disclosed in JP-A-4-103634 or a rubber cement as disclosed in JP-A-63-234075.

However, even a timing belt employing reinforcing fiber coated with a coating film formed by the RFL treating agent disclosed in the above JP-A-4-103634, is still inadequate in oil resistance, since a latex of a vinylpyridine/styrene/butadiene copolymer, whereby the oil resistance of the rubber itself is relatively low, is used in combination. Further, even if only a latex of a common solid NBR as disclosed in the same publication is incorporated as a latex component without using such a vinylpyridine/styrene/butadiene copolymer latex, the tackiness (the degree of adhesiveness) of the reinforcing fiber tends to be low, and there will be a problem that as the time passes, the belt undergoes elongation, thus leading to a trouble in the function of the power transmission mechanism.

Further, in a case where a rubber cement as disclosed in JP-A-63-234075 is used, such a rubber cement is one having a rubber component or the like dissolved in an organic solvent, and when a RFL treating agent using a rubber latex and water as a dispersing medium, and such a rubber cement, are compared at the same level of concentration, the latter tends to have an extremely high viscosity. A rubber cement having such a high viscosity may be used without any trouble in an application where a sufficient function can be obtained by coating it as an adhesive only on the surface of a fiber product, but in the case of a continuous fiber (strand) to be used as a reinforcing material (core wire) for a rubber belt such as a timing belt, it is necessary not only that the treating agent covers the surface of the glass fiber having a plurality of glass monofilaments bundled, but also that the treating agent is impregnated also into its interior, and if such impregnation is inadequate, the durability of the rubber belt tends to be low. Accordingly, the rubber cement as disclosed in the above prior art has a problem that it is not useful for such an application as a reinforcing material for a rubber belt, wherein the treating agent is required to be impregnated into the interior of the glass fiber.

Accordingly, the present invention has been made to solve the above problems, and it is an object of the present invention to provide a reinforcing fiber for rubber products, whereby rubber products excellent in oil resistance, such as timing belts which can be used for a long period of time in an environment in contact with the engine oil, can be obtained.

To solve the above problems, the fiber for reinforcing rubber products of the present invention comprises glass fiber coated with a coating film formed by a treating agent comprising a water-soluble condensate of resorcinol and formaldehyde, a latex of a solid acrylonitrile/butadiene copolymer and a latex of a liquid acrylonitrile/butadiene copolymer.

According to the fiber for reinforcing rubber products of the present invention, glass fiber is coated with a coating film formed by a treating agent comprising the above-mentioned specific components having oil resistance, whereby it is possible to increase the oil resistance of a rubber product employing such fiber as a reinforcing material. Especially, a timing belt employing such fiber as a core wire, has good oil resistance. Namely, in addition to the latex of a solid acrylonitrile/butadiene copolymer, the latex of a liquid acrylonitrile/butadiene copolymer is employed, whereby the tackiness of the reinforcing fiber is high, and the mutual adhesion of glass fibers (primary twisted yarns) constituting the reinforcing fiber is improved, whereby there will be no such a problem that elongation or shrinkage of the belt will result as the time passes thereby to bring about a trouble in the function of the power transmission mechanism, and there will be no such a trouble that the strength of the belt remarkably deteriorates due to contact with an oil or due to bending fatigue.

In the above fiber for reinforcing rubber products, the latex of a solid acrylonitrile/butadiene copolymer is preferably a latex of a self-crosslinking acrylonitrile/butadiene copolymer or a soap-free acrylonitrile/butadiene copolymer latex, whereby the oil resistance or the heat resistance of the finally obtainable timing belt can be further increased.

The above treating agent may further contain at least one component selected from the group consisting of a latex of a halogen-containing polymer, a latex of an acrylate polymer and an epoxy resin emulsion, whereby it is possible to increase the adhesion to a second coating film formed by a second treating agent which will be described hereinafter or to increase the resistance against influences of metal oxides, nitrogen oxides or sulfur oxides which will be included in a very small amount in an engine oil as the time of operation of an automobile engine passes.

Further, the glass fiber coated with the coating film formed by the treating agent comprising the above-mentioned specific components, is preferably further coated with a second coating film formed by a second treating agent comprising a rubber, a vulcanizing agent and an inorganic filler, whereby it is possible to further increase the adhesion to the rubber composition as the base material for rubber products such as tires or rubber belts including timing belts.

In the accompanying drawing, FIG. 1 is a schematic view illustrating the structure of a bending fatigue under oily condition tester.

Now, the present invention will be described in detail with reference to the preferred embodiments. In the following description, "parts" means "parts by mass", and "%" means "mass %" unless otherwise specified.

Firstly, the treating agent (hereinafter referred to as the first treating agent) comprising a water-soluble condensate of resorcinol and formaldehyde, a latex of a solid acrylonitrile/butadiene copolymer and a latex of a liquid acrylonitrile/butadiene copolymer, will be described.

As the water-soluble condensate of resorcinol and formaldehyde (hereinafter referred to as the RF condensate) to be incorporated to the first treating agent, it is possible to use a water-soluble initial addition condensate of resorcinol and formaldehyde, rich in oxymethyl groups, obtained by reacting resorcinol and formaldehyde in the presence of an alkaline catalyst such as an alkali metal hydroxide, ammonia or amine. Particularly preferred is a RF condensate obtained by reacting resorcinol and formaldehyde in a molar ratio of from 1:0.3 to 1:2.5.

The latex of a solid acrylonitrile/butadiene copolymer (hereinafter referred to as a solid NBR latex) to be incorporated to the first treating agent, is a latex whereby after removal of the dispersing medium, a solid acrylonitrile/butadiene copolymer (so-called NBR) is obtainable as an evaporation residue at room temperature. Here, "solid" includes "bulky" and "film-form". Such a solid NBR latex is preferably a latex of an acrylonitrile/butadiene copolymer wherein the amount of the bound acrylonitrile is from 15 to 50%.

Further, with a view to further improving the oil resistance or the heat resistance of the finally obtainable timing belt, the above solid NBR latex is preferably a latex of a self-crosslinking acrylonitrile/butadiene copolymer (hereinafter referred to as a self-crosslinking NBR latex) or a soap-free acrylonitrile/butadiene copolymer latex (hereinafter referred to as a soap-free NBR latex), particularly preferably a self-crosslinking NBR latex.

The self-crosslinking NBR latex is a latex of a copolymer having a self-crosslinkable monomer introduced into an acrylonitrile/butadiene copolymer. As such a self-crosslinking NBR latex, a latex of an acrylonitrile/butadiene copolymer obtained by copolymerizing an ethylenic monomer such as N-methylol (meth)acrylamide together with acrylonitrile and butadiene, may be employed.

Whereas, the soap-free NBR latex is a latex which contains no surfactant or a very small amount of a surfactant as an emulsifier. As such a soap-free NBR latex, a latex of an acrylonitrile/butadiene copolymer obtained by emulsion polymerization of monomers by means of an alkaline soluble oligomer as an emulsifier, may be employed.

The latex of a liquid acrylonitrile/butadiene copolymer (hereinafter referred to as a liquid NBR latex) to be incorporated to the first treating agent, is a latex whereby after removing the dispersing medium, a liquid or viscous acrylonitrile/butadiene copolymer (so-called NBR) is obtainable as an evaporation residue at room temperature. Such a liquid NBR latex is preferably a latex of an acrylonitrile/butadiene copolymer having a weight average molecular weight of from 1,000 to 70,000, wherein the amount of the bound acrylonitrile is from 15 to 50%.

In addition to the above RF condensate, the solid NBR latex and the liquid NBR latex, the first treating agent may further contain additives similar to those commonly used in conventional RFL treating agents, such as anti-aging agents, other rubber latexes or resin emulsions. As an anti-aging agent, a liquid emulsified product of a mineral oil may be mentioned. Other rubber latexes may be a latex of a halogen-containing polymer, a latex of an acrylate polymer, a latex of a styrene/butadiene copolymer, and a latex of a polybutadiene. The resin emulsions may be an epoxy resin emulsion, an acrylic resin emulsion and a phenoxy resin emulsion.

The halogen-containing polymer in the above latex of a halogen-containing polymer may, for example, be chlorinated rubber, chloroprene rubber or chlorosulfonated polyethylene, preferably chlorosulfonated polyethylene. Further, the acrylate polymer in the above latex of an acrylate polymer may, for example, be a polymer having carboxyl groups, acrylonitrile groups or styrene groups introduced to a polymer of an alkyl acrylate or an alkyl methacrylate, which is rubbery and has elasticity. Further, the epoxy resin in the above epoxy resin emulsion may, for example, be a bisphenol A type epoxy resin or a phenol novolac type epoxy resin.

Particularly for the purpose of further increasing the adhesion to the coating film formed by the second treating agent which will be described hereinafter or for the purpose of increasing the resistance against influences of metal oxides, nitrogen oxides or sulfur oxides which will be included in a very small amount in an engine oil as the time of operation of an automobile engine passes, it is preferred to incorporate at least one component selected from the group consisting of a latex of a halogen-containing polymer, a latex of an acrylate polymer and an epoxy resin emulsion, among the above-described components to be incorporated to the first treating agent, as the case requires.

The first treating agent in the present invention can be obtained by mixing the above RF condensate, the solid NBR latex, the liquid NBR latex and the above-described components to be incorporated as the case requires, with water, by a usual method. In this first treating agent, it is preferred to incorporate the liquid NBR latex in a ratio of from 10 to 900 parts, more preferably from 30 to 300 parts, particularly preferably from 65 to 150 parts, per 100 parts of the solid NBR latex. If the ratio of the liquid NBR latex is less than 10 parts, the tackiness (the degree of adhesiveness) of the obtainable reinforcing fiber tends to be low, and a problem may occur such that the finally obtained timing belt undergoes elongation as the time of use passes. If the ratio of the liquid NBR latex exceeds 900 parts, the tackiness of the obtainable reinforcing fiber tends to be extremely high, thus leading to a trouble in the production of the reinforcing fiber. The above ratio is the ratio as the evaporation residue.

Further, as the ratios, per 100 parts of the solid NBR latex, of the above-described components to be incorporated to the first treating agent, as the case requires, other rubber latex is preferably from 10 to 400 parts, more preferably from 30 to 300 parts, and the resin emulsion is preferably from 2 to 70 parts, more preferably from 5 to 18 parts. Such ratios are the ratios as the evaporation residues, like other components.

Further, based on the total evaporation residue of the first treating agent, the proportion of the RF condensate is preferably from 0.5 to 15%, more preferably from 1 to 10%, as the evaluation residue. On the other hand, the proportion as the total latex including the solid NBR latex, the liquid NBR latex, and the optionally incorporated other rubber latex or resin emulsion, is preferably from 85 to 99.5%, more preferably from 90 to 99%, as the evaluation residue. If the proportion of the total latex departs from the above range, there may be a case where a problem will result in the adhesion between the rubber and the obtainable reinforcing fiber or in the bending fatigue resistance of the finally obtainable timing belt.

Further, the concentration of the first treating agent, in other words, the ratio of the total amount of the evaporation residues of the above RF condensate, the solid NBR latex, the liquid NBR latex and the optionally incorporated components, in the first treating agent, is preferably from 10 to 50%, more preferably from 20 to 40%. If such a concentration is less than 10%, it is likely to be difficult to impregnate the first treating agent to the glass fiber in a sufficient amount, and if it exceeds 50%, the stability of the first treating agent tends to be poor, and it may easily be gelled.

In the present invention, the glass fiber is not particularly limited, and one which is the same as a continuous glass fiber commonly used for a reinforcing fiber for conventional rubber products may be employed. For example, one obtained by bundling from 200 to 600 glass monofilaments having a diameter of from 7 to 9 $\mu$m, may be employed. Further, it is preferred that to such glass fiber, a binding agent containing a silane coupling agent and a film-forming agent, is applied. Further, the composition of glass forming the glass monofilaments, is not particularly limited, and E glass or S glass may, for example, be mentioned.

The fiber for reinforcing rubber products of the present invention is one having the above-described glass fiber coated with a coating film formed by the above-described first treating agent (hereinafter referred to as a first coating film). However, in order to further increase the adhesion to the rubber composition as the base material for rubber products such as tires or rubber belts including timing belts, it is preferably further coated with a second coating film formed by a second treating agent comprising a rubber, a vulcanizing agent and an inorganic filler. As such a second treating agent, a treating agent disclosed in e.g. JP-A-63-126975 or JP-A-11-241275 may be employed.

Further, the fiber for reinforcing rubber products of the present invention, coated with the above-mentioned second coating film, may further be coated with a third coating film formed by a third treating agent, as disclosed in JP-A-3-269177 or JP-A-7-190149.

The rubber to be incorporated to the second treating agent, may be a halogen-containing polymer or a hydrogenated nitrile rubber. As such a halogen-containing polymer, chlorinated rubber, chloroprene rubber, chlorinated polyethylene, a chlorinated ethylene/propylene copolymer, chlorinated polyvinyl chloride or chlorosulfonated polyethylene, may, for example, be used. It is preferred to use chlorosulfonated polyethylene among them.

Further, as the vulcanizing agent, a polynitroso aromatic compound or a benzoquinone may, for example, be used. The polynitroso aromatic compound may be p-dinitrosobenzene or poly p-dinitrosobenzene, and the benzoquinone may be tetrachlorobenzoquinone, p,p'-dibenzoylbenzoquinonedioxime or p-benzoquinone dioxime. It is preferred to use poly p-dinitrosobenzene, tetrachlorobenzoquinone, p,p'-dibenzoylbenzoquinonedioxime among them.

As the inorganic filler, one commonly used as a filler for a rubber composition, such as silica or carbon black, may be used. Further, to the second treating agent, in addition to the above components, an isocyanate or additives may be incorporated, as the case requires.

As an isocyanate, methylenediphenyl isocyanate (MDI), toluene diisocyanate (TDI), triphenylmethane triisocyanate or naphthalene diisocyanate (NDI) may, for example, be used. An isocyanate monomer has high volatility and thus is not preferred from the viewpoint of the safety and handling efficiency, and it is preferred to use a polyisocyanate having a relatively small molecular weight and being rich in reactivity, such as a dimer. Such a polyisocyanate is preferably one having a polymerization degree of from 2 to 10. Further, as the additive, a softening agent, an age-preventing agent or a vulcanization accelerator may, for example, be mentioned.

The second treating agent in the present invention can be obtained by mixing the above rubber, the vulcanizing agent, the inorganic filler and optionally incorporated isocyanate or additive, with an organic solvent in accordance with a conventional method to dissolve the respective components. As such an organic solvent, one which is commonly used in conventional rubber cement, may be employed. For example, xylene, toluene or methyl ethyl ketone may be mentioned.

When the isocyanate is incorporated to this second treating agent, it is preferred that the ratio of the isocyanate to the rubber is from 100:10 to 100:100 by mass ratio. If the ratio of the isocyanate is larger than the above range, the heat resistance or the bending fatigue resistance of the resulting reinforcing fiber, tends to be low. If the ratio of the isocyanate is smaller than the above range, the adhesion to the rubber composition, of the resulting reinforcing fiber is likely to be low.

Further, based on the entirety including the organic solvent, of the second treating agent, the proportion of the sum of the rubber and the isocyanate is preferably from 3 to 15%, more preferably from 5 to 10%. If the proportion of both is less than 3%, it is likely to be difficult to coat the second treating agent to the glass fiber in an adequate amount, and if it exceeds 15%, the viscosity of the second treating agent tends to be too high, whereby coating on the glass fiber is likely to be irregular.

Further, based on the entirety including the organic solvent, of the second treating agent, the proportion of the vulcanizing agent is preferably from 0.3 to 2%, more preferably from 0.6 to 1%. Likewise, the proportion of the inorganic filler is preferably from 0.5 to 5%, more preferably from 1 to 3%. If the proportion of the vulcanizing agent is less than 0.3%, the function as the vulcanizing agent tends to be inadequate, peeling is likely to take place between the first coating film and the second coating film of the resulting reinforcing fiber, and if it exceeds 2%, peeling is likely to take place between the reinforcing fiber and the base material rubber of the finally obtainable rubber product.

Now, a process for producing the fiber for reinforcing rubber products of the present invention, will be described, but it should be understood that the present invention is by no means restricted to such a specific process given as an example.

Firstly, in a bath filled with the above-described first treating agent, glass fiber is continuously immersed to have the first treating agent deposited and impregnated on the glass fiber. Then, the glass fiber is continuously heated in a hot air oven of from 200 to 350° C. to dry and solidify the first treating agent to form a first coating film thereby to obtain coated glass fiber.

Here, the deposited amount of the first treating agent on the coated glass fiber, i.e. the ratio of the first coating film to the coated glass fiber is preferably from 12 to 25%, more preferably from 16 to 22%, as the evaporation residue. If the deposited amount is less than 12%, individual glass monofilaments constituting the coated glass fiber tend to be hardly adequately covered by the first coating film, and monofilaments are likely to contact one another and tend to be abraded by friction, so that bending fatigue resistance of the finally obtainable rubber belts, etc., tends to be low, such being undesirable. On the other hand, if the deposited amount exceeds 25%, the flexibility of the coating film tends to be poor, and the bending fatigue resistance of the finally obtainable rubber belts, etc., likely tends to be low, such being undesirable.

Then, the above coated glass fibers are individually or in combination of a plurality of them, subjected to primary twisting by a twisting machine such as a ring twisting machine to obtain a primary twisted yarn. The number of twists in this primary twisting step is preferably from 0.5 to 4 twists/25 mm. Otherwise, the coated glass fiber once taken up in a non-twisted state, may be subjected to primary twisting to obtain a primary twisted yarn, or a take-up apparatus in the above step of obtaining a coated glass fiber is modified to be a twisting machine, so that a step of obtaining a coated glass fiber and a primary twisting step may be carried out simultaneously to obtain a primary twisted yarn.

Then, from 5 to 20 primary twisted yarns are put together and subjected to second twisting by means of a twisting machine such as a ring twisting machine or a flier twisting machine to obtain a second twisted yarn thereby to obtain the fiber for reinforcing rubber products of the present invention. The number of twists in this second twisting step is preferably from 0.5 to 4 twists/25 mm, and like in the conventional fiber for reinforcing rubber products, the twisting direction in the second twisting step is adjusted to be opposite to the twisting direction in the primary twisting step.

The fiber for reinforcing rubber products of the present invention, obtained by the above-described step of coating the glass fiber with the first coating film, the primary twisting step and the second twisting step, can be used as it is, as a reinforcing material for rubber products. However, as mentioned above, in order to further increase the adhesion to the rubber composition as the base material of rubber products such as tires or rubber belts including timing belts, especially in order to make it suitable as a reinforcing material for rubber products, for which high performance such as heat resistance is required, it is preferably coated with a second coating film formed by a second treating agent. In such a case, in addition to the above steps, treatment by the following step is applied to the second twisted yarn.

Namely, in a bath filled with the above-described second treating agent, the above-mentioned second twisted yarn is continuously immersed to have the second treating agent deposited on the second twisted yarn. Then, the second twisted yarn is continuously heated in e.g. a hot air oven of from 120 to 200° C. to dry and solidify the second treating agent to form a second coating film thereby to obtain the fiber for reinforcing rubber products of the present invention. Here, the deposited amount of the second treating agent in the reinforcing fiber, i.e. the ratio of the second coating film to the reinforcing fiber, is preferably from 0.5 to 10%, more preferably from 2 to 7%, as the evaporation residue. If the deposited amount is less than 0.5%, the effect for increasing the adhesion between the reinforcing fiber and the rubber composition as the base material of rubber products is likely to be inadequate, and if the deposited amount exceeds 10%, the adhesion may rather be hindered.

Further, the rubber composition as the base material of rubber products to be reinforced by the fiber for reinforcing rubber products of the present invention, is not particularly limited. However, such rubber composition is preferably one containing a hydrogenated nitrile rubber as the main component, from such a viewpoint that a timing belt excellent in oil resistance and heat resistance can thereby be obtained.

Now, the present invention will be described in further detail with reference to Examples. However, it should be understood that the present invention is by no means restricted to such specific Examples.

EXAMPLE 1

26.7 Parts of a self-crosslinking NBR latex ("AF1001", tradename, manufactured by ZEON Corporation, evaporation residue: 45%) as a solid NBR latex, 36.4 parts of a liquid NBR latex ("1312", tradename, manufactured by ZEON Corporation, evaporation residue: 33%), 14.3 parts of a RF condensate (evaporation residue: 7%) and deionized water, were mixed to obtain a first treating agent having a concentration of 25%.

Then, 200 glass monofilaments made of high strength glass (S glass) and having a diameter of 7 μm, were bundled while applying a binding agent, followed by drying to obtain a glass fiber. Three such glass fibers drawn together were continuously immersed in a bath filled with the above-mentioned first treating agent to have the first treating agent deposited and impregnated on the glass fibers. Then, the glass fibers are continuously heated for one minute in a hot air oven at a temperature of 250° C. to dry and solidify the first treating agent, to form a first coating film thereby to obtain coated glass fibers. Here, the deposited amount of the first treating agent was 18% as the evaporation residue, based on the coated glass fibers.

Further, the above coated glass fibers were individually subjected to primary twisting by means of a ring twisting machine so that the number of twist became 2 twists/25 mm to obtain primary twisted yarns. Then, 11 such primary twisted yarns drawn together, were subjected to second twisting by means of a separate ring twisting machine in a twisting direction opposite to the primary twisting so that the number of twists became 2 twists/25 mm, to obtain second twisted yarns.

Then, 10 parts of chlorosulfonated polyethylene ("Hypalon 40", tradename, manufactured by Showa Neoprene K.K.) as a halogen-containing polymer, 5 parts of a polyisocyanate ("MR-200", tradename, manufactured by NIPPON POLYURETHANE INDUSTRY CO., LTD.), 2 parts of p,p'-dibenzoylbenzoquinone dioxime as a vulcanizing agent, 5 parts of carbon black as an inorganic filler, and toluene as an organic solvent, were mixed to obtain a second treating agent having a concentration of 10%.

The above second twisted yarns were continuously immersed in a bath filled with the above second treating agent to have the second treating agent deposited on the second twisted yarns. Then, the second twisted yarns were continuously heated for one minute in a hot air oven at a temperature of 130° C. to dry and solidify the second treating agent to form a second coating film thereby to obtain the fiber for reinforcing rubber products of the present invention. Here, the deposited amount of the second treating agent was 3.5% as the evaporation residue based on the reinforcing fiber.

EXAMPLE 2

The fiber for reinforcing rubber products of the present invention was obtained by using the same glass fiber and second treating agent as used in Example 1 and employing the same process and production conditions as used in Example 1, except that instead of 26.7 parts of the self-crosslinking NBR latex incorporated to the first treating agent in Example 1, 28.6 parts of a soap-free NBR latex ("SX1503", tradename, manufactured by ZEON Corporation, evaporation residue: 42%) as a solid NBR latex, was incorporated, and further, 0.5 part of aqueous ammonia (concentration: 18%) was added to obtain a first treating agent having a concentration of 25%.

EXAMPLE 3

The fiber for reinforcing rubber products of the present invention was obtained by using the same glass fiber and second treating agent as in Example 1 and employing the same process and production conditions as in Example 1, except that instead of 26.7 parts of the self-crosslinking NBR latex incorporated to the first treating agent in Example 1, 29.3 parts of the solid NBR latex ("1562", tradename, manufactured by ZEON Corporation, evaporation residue: 41%) was incorporated, and further, 0.5 part of aqueous ammonia (concentration: 18%) was added to obtain a first treating agent having a concentration of 25%.

COMPARATIVE EXAMPLE 1

35.7 Parts of a vinylpyridine/styrene/butadiene terpolymer latex ("2518FS", tradename, manufactured by ZEON Corporation, evaporation residue: 40.5%), 17.9 parts of a carboxyl-modified styrene/butadiene copolymer latex ("2570X5", tradename, manufactured by ZEON Corporation, evaporation residue: 41%), 2.8 parts of a liquid emulsified product of a mineral oil (evaporation residue: 50%), 25.7 parts of a RF condensate (evaporation residue: 7%), 2.0 parts of aqueous ammonia (concentration: 18%) and deionized water, were mixed to obtain a first treating agent having a concentration of 25%.

The fiber for reinforcing rubber products, was obtained by using the same glass fiber and second treating agent as in Example 1 and employing the same process and production conditions as in Example 1, except that the above-mentioned first treating agent was used.

COMPARATIVE EXAMPLE 2

53.3 Parts of a self-crosslinking NBR latex ("AF1001", tradename, manufactured by ZEON Corporation, evaporation residue: 45%) as a solid NBR latex, 14.3 parts of a RF condensate (evaporation residue: 7%) and deionized water, were mixed to obtain a first treating agent having a concentration of 25%.

The fiber for reinforcing rubber products, was obtained by using the same glass fiber and second treating agent as in Example 1 and employing the same process and production conditions as in Example 1, except that the above-mentioned first treating agent was used.

COMPARATIVE EXAMPLE 3

57.1 Parts of a soap-free NBR latex ("SX1503", tradename, manufactured by ZEON Corporation, evaporation residue: 42%) as a solid NBR latex, 14.3 parts of a RF condensate (evaporation residue: 7%), 0.5 part of aqueous ammonia (concentration: 18%) and deionized water, were mixed to obtain a first treating agent having a concentration of 25%.

The fiber for reinforcing rubber products, was obtained by using the same glass fiber and second treating agent as in Example 1 and employing the same process and production conditions as in Example 1, except that the above-mentioned first treating agent was used.

COMPARATIVE EXAMPLE 4

58.5 Parts of the solid NBR latex "1562", tradename, manufactured by ZEON Corporation, evaporation residue: 41%) 14.3 parts of a RF condensate (evaporation residue: 7%), 0.5 part of aqueous ammonia (concentration: 18%) and deionized water, were mixed to obtain a first treating agent having a concentration of 25%.

The fiber for reinforcing rubber products, was obtained by using the same glass fiber and second treating agent as in Example 1 and employing the same process and production conditions as in Example 1, except that the above-mentioned first treating agent was used.

TEST EXAMPLES

Using the respective fibers for reinforcing rubber products, obtained in Examples 1 to 3 and Comparative Examples 1 to 4, as reinforcing materials, and a rubber composition having a composition shown in Table 1, as the base material, flat belts each having a width of 9 mm, a thickness of 2 mm and a length of 400 mm, were prepared, respectively, and the oil resistance was evaluated by the method shown below.

Each flat belt has a structure wherein one reinforcing fiber is embedded at the center portion of a strip-shaped flat rubber plate, and the embedded reinforcing fiber extends from both ends of the flat rubber plate, respectively, and the portion of the flat rubber plate is the belt portion having the above size.

TABLE 1

| Raw materials | Amounts (parts) |
|---|---|
| Hydrogenated nitrile rubber ("Zetpol 2000", tradename, manufactured by ZEON Corporation) | 100 |
| Zinc oxide | 10 |

TABLE 1-continued

| Raw materials | Amounts (parts) |
|---|---|
| Zinc methacrylate | 15 |
| Zinc salt of 2-mercaptobenzimidazole | 1 |
| Substituted diphenyl amine | 1 |
| Carbon black (HAF) | 3 |
| Silica hydrate | 30 |
| Dicmyl peroxide | 10 |
| 1,3-Bis(t-butylperoxyisopropyl) benzene | 5 |
| Sulfur | 0.3 |
| TMTD (tetramethylthiuram disulfide) | 1 |
| MBT (2-mercaptobenzothiazole) | 0.5 |

Method for Evaluation of Oil Resistance (1) Tensile Strength Retention after Bending Fatigue under Oily Condition A test was carried out by means of a bending fatigue under oily condition tester having a structure shown in FIG. 1. In FIG. 1, three flat pulleys 21, 22 and 23 having a diameter of 30 mm are fixed to a reciprocating motion member 2 in a rotatable state, and this reciprocating motion member 2 is slidably mounted on a slide rail 3. The reciprocating motion member 2 is driven by a cylinder shaft 41 of an air cylinder 4, connected thereto, and reciprocates in the direction shown by the arrows in the Figure. Further, the slide rail 3 is fixed to stands 6 and 7, and the air cylinder 4 is also fixed to the stand 6. The stands 6 and 7 are fixed to a platform 8.

Firstly, a flat belt 5 was mounted on the above bending fatigue under oily condition tester 1, as shown in FIG. 1. Namely, a belt portion 51 of the flat belt 5 was put along the flat pulleys 21, 22 and 23, and one end of the reinforcing fiber 52 extending from the end of the flat belt 5 was put on pulleys 9 and 10 and then fixed to a bolt 12 fixed to the platform 8. The other end of the reinforcing fiber 52 is put on a pulley 11, and then connected to a weight 13 (mass: 11.5 kg) in order to give a tension to the flat belt 5.

While dropping an automobile engine oil on a portion where the flat belt 5 and the flat pulley 21 were in contact, in an amount of 100 cc/hr from above by a supply apparatus not shown, the reciprocating motion member 2 was moved in a one way moving distance of 180 mm, and along with the reciprocating motion, the portions where the flat belt 5 was in contact with the flat pulleys 21, 22 and 23, were moved to impart bending to the belt portion 51 thereby to subject the flat belt 5 to an bending fatigue under oily condition test.

Further, the atmospheric temperature was maintained to be 120° C. by a constant temperature vessel not shown, which was installed to surround the circumferences of the reciprocating motion member 2, the flat pulleys 21, 22 and 23 and the flat belt 5.

The test was carried out in such a manner that by counting one reciprocation of the reciprocating motion member 2 as one time, the reciprocating motion member 2 was reciprocated 1,000,000 times at a speed of 60 times per minute, to let the flat belt 5 undergo bending fatigue. Then, the flat belt 5 was dismounted from the bending fatigue under oily condition tester 1, and the tensile strength was measured under a condition such that the tensile speed of the measuring machine was 250 mm/min.

The evaluation was made in such a manner that a value obtained by dividing the tensile strength value of the flat belt after the bending fatigue under oily condition test by the tensile strength value of the flat belt which was prepared under the same conditions by means of the same reinforcing fiber and not subjected to the bending fatigue under oily condition test, was represented by a percentage, which was taken as the tensile strength retention. This tensile strength retention was used as an index to evaluate the degree of deterioration in the tensile strength of the flat belt by the bending fatigue under oily condition test. The results are shown in Table 2.

(2) Extension and Contraction of the Flat Belt after the Bending Fatigue Under Oily Condition On the belt portion of each flat belt, two marked lines were drawn with a distance of about 300 mm, and the distance was measured in the order of 0.1 mm. Then, the flat belt was mounted on the bending fatigue under oily condition tester, and the test was carried out under the same conditions as above.

After the bending fatigue under oily condition test by reciprocation of 1,000,000 times, the flat belt was dismounted from the tester, and the distance between the marked lines was measured in the order of 0.1 mm. Then, a value obtained by dividing the value obtained by deducting the distance value between the marked lines before the test from the distance value between the marked lines after the test, by the distance value between the marked lines before the test, was represented by a percentage, which was taken as an elongation. This elongation was used as an index to evaluate the degree of the expansion and contraction of the flat belt after the bending fatigue under oily condition test. The results are shown in Table 2.

TABLE 2

| | Ex. 1 | Ex. 2 | Ex. 3 | |
|---|---|---|---|---|
| Tensile strength retention (%) | 75 | 74 | 63 | |
| Elongation (%) | ±0 | ±0 | ±0 | |

| | Comp. Ex. 1 | Comp. Ex. 2 | Comp. Ex. 3 | Comp. Ex. 4 |
|---|---|---|---|---|
| Tensile strength retention (%) | 40 | 37 | 35 | 33 |
| Elongation (%) | −0.2 | +0.2 | +0.2 | +0.2 |

From the evaluation results shown in Table 2, it is evident that the flat belts employing the reinforcing fibers of Comparative Examples 1 to 4 are inferior in oil resistance. Namely, it is evident that with the reinforcing fiber employing a RFL treating agent having a conventional common composition (Comparative Example 1) and with the reinforcing fibers employing RFL treating agents wherein only a solid NBR latex was incorporated, and no liquid NBR latex was incorporated (Comparative Examples 2 to 4), the tensile strength retention of the obtained flat belts after the bending fatigue under oily condition tests, was very low, and they underwent bending fatigue under a high temperature and the reinforcing fibers received a serious damage by the contact with the engine oil, whereby the tensile strength decreased.

Further, with the flat belt employing the reinforcing fiber of Comparative Example 1, the elongation after the bending fatigue under oily condition test indicates a contraction of −0.2%, and if the elongation of a flat belt is at this level, in an oil injection running test by a real timing belt (synchronous belt), the mounting tension increases substantially, and abrasion of the timing belt in engagement with the pulley tends to be remarkable, and the timing belt tends to be broken at an early stage. Further, with the flat belts employing the reinforcing fibers of Comparative Examples 2 to 4, the elongation after the bending fatigue under oily condition tests shows an extension at a level of +0.2%, and if the elongation of a flat belt is at this level, in an oil injection running test by a real timing belt, the mounting tension tends to be substantially none, and the timing belt is likely to flutter, whereby the timing belt is likely to be broken at an early stage. Accordingly, it is evident that the timing belts employing the reinforcing fibers of the Comparative Examples 1 to 4 will have low oil resistance.

Whereas, in Examples 1 to 3 representing the reinforcing fibers for rubber products of the present invention, the tensile strength retention of the obtained flat belts after the bending fatigue under oily condition tests, is high, and the elongation of the flat belts after the bending fatigue under oily condition tests, is ±0, and the flat belts are free from extension or contraction. It is therefore evident that by combining the RF condensate, the solid NBR latex and the liquid NBR latex as a treating agent for coating glass fiber, excellent oil resistance can be obtained which can not be obtained by a conventional common treating agent or by a treating agent by the solid NBR was incorporated alone.

As described in the foregoing, in the reinforcing fiber for rubber products of the present invention, glass fiber is coated by a coating film formed by a treating agent comprising the RF condensate, the solid NBR latex and the liquid NBR latex, whereby when such reinforcing fiber is used as a reinforcing material for rubber products such as rubber belts or tires, particularly as a reinforcing material for timing belts, the oil resistance thereof can substantially be improved. Further, such effects are remarkable when a self-crosslinking NBR latex or a soap-free NBR latex is employed as the solid NBR latex. Accordingly, timing belts employing the reinforcing fiber for rubber products of the present invention, can be used even under a severe environmental condition in direct contact with an oil, like in the interior of the engine block of an automobile engine.

The entire disclosure of Japanese Patent Application No. 2001-069034 filed on Mar. 12, 2001 and Japanese Patent Application No. 2002-025589 filed on Feb. 1, 2002 including specification, claims, drawings and summary are incorporated herein by reference in its entirety.

What is claimed is:

1. Fiber for reinforcing rubber products, which comprises glass fiber coated with a coating film formed by a treating agent comprising a water-soluble condensate of resorcinol and formaldehyde, a latex of a solid acrylonitrile/butadiene copolymer and a latex of a liquid acrylonitrile/butadiene copolymer.

2. The fiber for reinforcing rubber products according to claim 1, wherein the latex of a solid acrylonitrile/butadiene copolymer is a latex of a self-crosslinking acrylonitrile/butadiene copolymer.

3. The fiber for reinforcing rubber products according to claim 2, wherein said self-crosslinking acrylonitrile/butadiene copolymer is obtained by polymerizing an ethylenic monomer with acrylonitrile and butadiene.

4. The fiber for reinforcing rubber products according to claim 3, wherein said ethylenic monomer is N-methylol (meth)acrylamide.

5. The fiber for reinforcing rubber products according to claim 1, wherein the latex of a solid acrylonitrile/butadiene copolymer is a soap-free acrylonitrile/butadiene copolymer latex.

6. The fiber for reinforcing rubber products according to claim 1, wherein the treating agent further contains at least one component selected from the group consisting of a latex of a halogen-containing polymer, a latex of an acrylate polymer and an epoxy resin emulsion.

7. The fiber for reinforcing rubber products according to claim 1, wherein the glass fiber coated with the coating film formed by the above treating agent, is further coated with a second coating film formed by a second treating agent comprising a rubber, a vulcanizing agent and an inorganic filler.

8. The fiber for reinforcing rubber products according to claim 1, wherein said water-soluble condensate of resorcinol and formaldehyde are present in a molar ratio of resorcinol to formaldehyde ranging from 1:0.3 to 1:2.5.

9. The fiber for reinforcing rubber products according to claim 1, wherein said latex of a solid acrylonitrile/butadiene copolymer is a latex of a solid acrylonitrile/butadiene copolymer wherein the amount of bound acrylonitrile ranges from 15 to 50%.

10. The fiber for reinforcing rubber products according to claim 1, wherein said latex of a liquid acrylonitrile/butadiene copolymer is a latex of a liquid acrylonitrile/butadiene copolymer wherein the weight average molecular weight of the copolymer ranges from 1000 to 70,000.

11. The fiber for reinforcing rubber products according to claim 10, wherein the amount of bound acrylonitrile in said latex of a liquid acrylonitrile/butadiene copolymer ranges from 15 to 50%.

12. The fiber for reinforcing rubber products according to claim 1, wherein the treating agent further comprises one or more additives selected from the group consisting of an anti-aging agent, a rubber latex, and a resin emulsion.

13. The fiber for reinforcing rubber products according to claim 1, wherein the latex of a liquid acrylonitrile/butadiene copolymer is in a ratio ranging from 10 to 900 parts per 100 part of the latex of a solid acrylonitrile/butadiene copolymer.

14. The fiber for reinforcing rubber products according to claim 13, wherein the latex of a liquid acrylonitrile/butadiene copolymer is in a ratio ranging from 30 to 300 parts per 100 part of the latex of a solid acrylonitrile/butadiene copolymer.

15. The fiber for reinforcing rubber products according to claim 14, wherein the latex of a liquid acrylonitrile/butadiene copolymer is in a ratio ranging from 65 to 150 parts per 100 part of the latex of a solid acrylonitrile/butadiene copolymer.

16. The fiber for reinforcing rubber products according to claim 1, wherein the water-soluble condensate of resorcinol and formaldehyde is in a concentration based on the total evaporation residue of the first treating anent ranging from 0.5 to 15%.

17. The fiber for reinforcing rubber products according to claim 16, wherein the water-soluble condensate of resorcinol and formaldehyde is in a concentration based on the total evaporation residue of the first treating agent ranging from 1 to 10%.

18. The fiber for reinforcing rubber products according to claim 1, wherein the glass fiber is obtained by bundling from 200 to 600 glass monofilaments having a diameter ranging from 7 to 9 $\mu$m.

19. The fiber for reinforcing rubber products according to claim 18, wherein the glass monofilaments are E glass or S glass.

20. The fiber for reinforcing rubber products according to claim 18, wherein the glass fiber has applied thereto at least one binding agent selected from the group consisting of a silane coupling agent and a film-forming agent.

* * * * *